United States Patent Office 2,890,728
Patented June 16, 1959

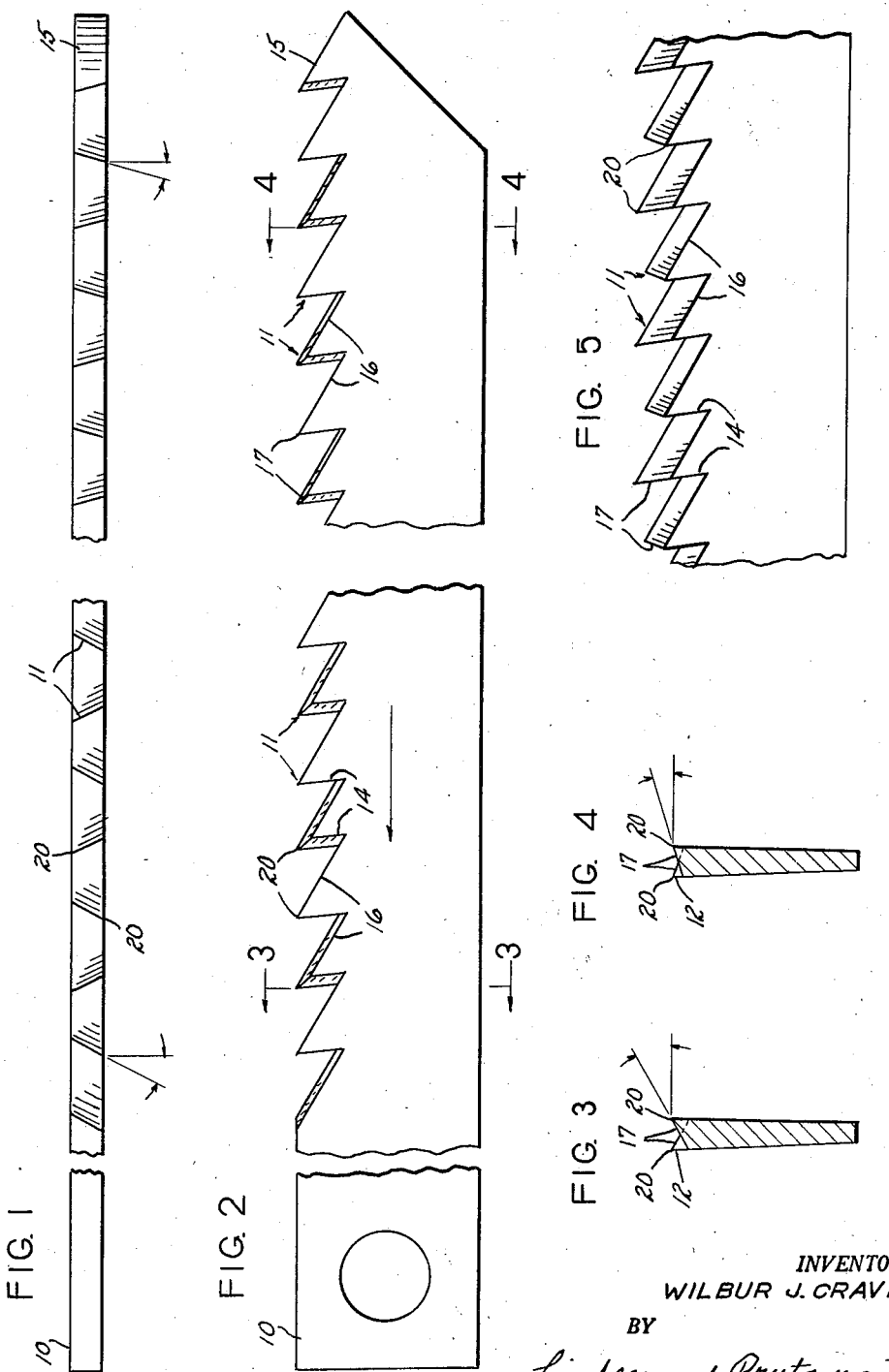

2,890,728

SABER SAW BLADE

Wilbur J. Craven, East Hartford, Conn., assignor to The Capewell Manufacturing Company, Hartford, Conn., a corporation of Connecticut Application March 11, 1957, Serial No. 645,317

3 Claims. (Cl. 143—133)

This invention relates to a novel and improved saber saw blade.

It is the object of this invention to provide a novel and improved saber saw blade having a tooth formation particularly adapted for cutting fibrous material such as wood which will provide a much smoother cut than has heretofore been attainable with blades of this type; which will provide increased cutting speed; and which will have less vibration than existing saber saw blades.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawings:

Fig. 1 is an edge view of a saber saw blade constructed in accordance with the invention;

Fig. 2 is a side elevational view of the blade of Fig. 1;

Fig. 3 is a cross sectional view along the line 3—3 of Fig. 2;

Fig. 4 is a cross sectional view along the line 4—4 of Fig. 2; and

Fig. 5 is a fragmentary perspective view of the blade of Fig. 2.

With reference to the drawings, a blade constructed in accordance with the invention is comprised of a shank 10 and a plurality of cutting teeth 11 extending along a portion of the front edge of the blade and facing generally in the direction of the shank 10. The blade is tapered in cross section from the front edge 12, as best shown in Figs. 3 and 4, to provide clearance for the teeth.

The face 14 of each tooth is inclined inwardly of the blade toward the tip 15 to provide a tooth having a positive rake, and further each face is inclined laterally of the front edge 12 of the blade with the next adjacent faces being inclined in opposite directions. The back 16 of each tooth is inclined inwardly of the blade toward the tip and also is inclined laterally of the front edge 12 and toward its respective face 14. The intersection of the back and face of each tooth thus forms a cutting edge 17 which is inclined laterally of the front edge 12 and inwardly of the blade with the next adjacent cutting edges being laterally inclined in opposite directions. It is to be noted that in the specific embodiment of the angle of inclination of the faces 14, and backs 16 inwardly of the blade is substantially constant over all the teeth.

In accordance with the invention, and with particular reference to Fig. 1, the blade is formed such that the angle of lateral inclination of the cutting edge 17 or fleam angle of the teeth 11 is smaller at the tip 15 than at the shank 10. In the specific embodiment, the fleam angle varies progressively from tooth to tooth although, as will be apparent, it is not necessary to vary every next adjacent tooth. This variation of the fleam angle results in a corresponding increase from tip to shank in the angle of inclination of the cutting edges 17 inwardly of the blade, as can be best seen in Figs. 3 and 4. Also, as can be seen in Figs. 3 and 4, this variation of the inward inclination of the cutting edges results in a decrease from tip to shank of the angle between the next adjacent cutting edges 17, and thus a corresponding decrease in the distance from the point at which the next adjacent cutting edges 17 intersect as viewed in Figs. 3 and 4 to the longitudinal center line of the blade.

The advantage of a blade constructed in accordance with the invention can best be seen from a consideration of the blade in cutting engagement with a piece of work. With the blade moving in the direction of the arrow of Fig. 2, the last two teeth to engage the work will leave a wedge in the bottom of the kerf which is generally complementary to the angle between the cutting edges 17 of these teeth. On movement of the blade in the opposite direction, the progressive decrease in the angle between adjacent cutting edges 17 of the teeth being passed through the kerf will effectively result in the major portion of each of the cutting edges 17 being drawn away from the bottom of the kerf, thus materially reducing the resistance to movement of the blade through the kerf in this direction.

Further, the above-described variation in the angle between the planes of adjacent cutting edges 17, brought about by the variation in fleam angle of the teeth, results in considerably improved performance of the blade as regards vibration and smoothness of cut. During initial movement of the blade in the direction of the arrow in Fig. 2 and for the reasons noted above, the majority of each cutting edge of the teeth adjacent the shank will be out of engagement with the bottom of the kerf; however, the sharp points 20 of these cutting edges will, as should be apparent from Fig. 3, engage the sides of the bottom of the kerf so as to slice through the fibers of the work although not removing much, if any, of the bottom of the kerf. As the teeth nearer the tip progressively engage the bottom of the kerf, the decrease in inward inclination of the cutting edges, as described above, will result in the removal of work at the bottom of the kerf which is now unsupported at its sides due to the previous slicing action of the teeth near the shank. Such a cutting action will, of course, result in a relatively light loading or reduction in loading of the blade toward the tip. This light loading toward the tip of a saber saw blade, which is relatively thin and supported in cantilever fashion, will tend to reduce the flexing and vibration of the tip of the blade during cutting. The reduction in vibration of the tip of the blade, of course, makes the blade easier to maneuver through a complex cut and contributes to an increase in the cutting speed. Further, the reduced flexing and vibration of the blade in the kerf materially improves the smoothness of cut.

It should be particularly noted that the slicing of the sides of the bottom of the kerf prior to removal of the majority of the stock from the bottom, as described above, makes the blade especially suited for the cutting of materials such as fiberglass. This cutting action prevents cracking or splitting of the material above the sides of the kerf, such as has been experienced in the previously developed blades. Further, such a blade has a materially greater service life when used to cut construction materials such as those comprised of cement and asbestos. In this connection, a blade service life corresponding to 50 lineal feet of cutting of such material has heretofore been considered satisfactory. With a blade constructed in accordance with the invention, it has been found to be possible to cut over 150 lineal feet of such material before requiring replacement of the blade.

It can thus be seen that there has been provided a saber saw blade particularly adapted to cut fibrous materials and having a novel and improved tooth formation which results in improved cutting action and performance as well as increased service life of the blade.

I claim:

1. A saber saw blade comprising a shank and a tip, and a plurality of teeth extending along one edge thereof between said shank and tip and facing toward the shank end of the blade, the fleam angle of the cutting edges of said teeth increasing progressively from the tip of the blade toward the shank.

2. A saber saw blade having a back edge and a cutting edge, said blade increasing in thickness from said back to said cutting edge, and a plurality of teeth extending along said cutting edge and facing one end of the blade, the fleam angle of consecutive teeth being inclined in opposite directions with the fleam angle of teeth of like inclination increasing from the other end of the blade toward said one end.

3. A saber saw blade comprising a shank and a tip, a front edge extending from said shank toward said tip, and a plurality of teeth disposed along said front edge all facing in the direction of the shank, said teeth being provided with a positive rake and consecutive teeth having fleam angles in opposite directions, the fleam angle of the teeth inclined in the same direction progressively increasing from the tip toward the shank.

References Cited in the file of this patent

UNITED STATES PATENTS

| | | |
|---|---|---|
| 1,732,692 | Peiseler | Oct. 22, 1929 |
| 2,141,504 | Balfour | Dec. 27, 1938 |
| 2,227,864 | Ronan | Jan. 7, 1941 |
| 2,568,870 | Ronan | Sept. 25, 1951 |
| 2,735,458 | Buchmann | Feb. 21, 1956 |